Aug. 28, 1951   C. M. STINSON   2,565,702
PLAYING CARD
Filed June 30, 1947   2 Sheets-Sheet 1

Inventor
Charles M. Stinson
By
Fishburn & Mullendore
Attorneys

Aug. 28, 1951  C. M. STINSON  2,565,702
PLAYING CARD
Filed June 30, 1947  2 Sheets-Sheet 2

Inventor
Charles M. Stinson
By
Fishburn & Mullendore
Attorneys

Patented Aug. 28, 1951

2,565,702

UNITED STATES PATENT OFFICE 2,565,702

PLAYING CARD

Charles M. Stinson, Kansas City, Mo.

Application June 30, 1947, Serial No. 758,161

1 Claim. (Cl. 273—152)

This invention relates to improvements in playing cards and more particularly to a pack of cards specifically designed for affording amusement in playing interesting games, as well as for educational purposes for giving actual practice in simple fundamentals of mathematics, including addition, subtraction, multiplication, division, and matching of combinations of numerals and colors.

The objects of the present invention are to provide a pack of playing cards for use in playing of games adapted for players of all ages to develop their minds, increase perception and reasoning ability; to provide a pack of cards for playing games using as a basis the basic mathematical calculations; to provide cards with numeral arrangements which help children to learn to recognize results of mathematical calculations at first sight and reduce their natural tendency to count on their fingers or use other time consuming and mistake-creating mental crutches; to provide each card with colors, symbols, numeral combinations and products of numbers of other cards in convenient arrangement for identifying cards from all sides; to provide a pack of cards with pairs of numerals and products in groupings that will allow multiplication and division games to be played with small groups of the cards and others added to the game as the players progress in their learning; and to provide auxiliary charts for aid in learning the number values of the combinations of each card of the pack.

In accomplishing these and other objects of the present invention I have provided an improved design of cards and arrangement of numerals thereon, together with appropriate symbols and colors indicating suits, the preferred forms of which are illustrated in the accompanying drawings, wherein:

Fig. 2 is a perspective view showing a pack of playing cards indicating the manner in which the identity numbers, symbols and products are visible when grouped in a player's hand.

Fig. 3 is a chart in the form of a card illustrating the arrangement of the suits and numeral combinations with the additive or plus number value of the respective cards.

Fig. 4 is a chart on an auxiliary card illustrating the arrangement of the suit and numeral combinations in forming the various minus number combinations of the identity numerals.

Fig. 5 is an elevational view of a card carrying a multiplication table for assistance in determining the product of the identity numerals.

Figure 1:
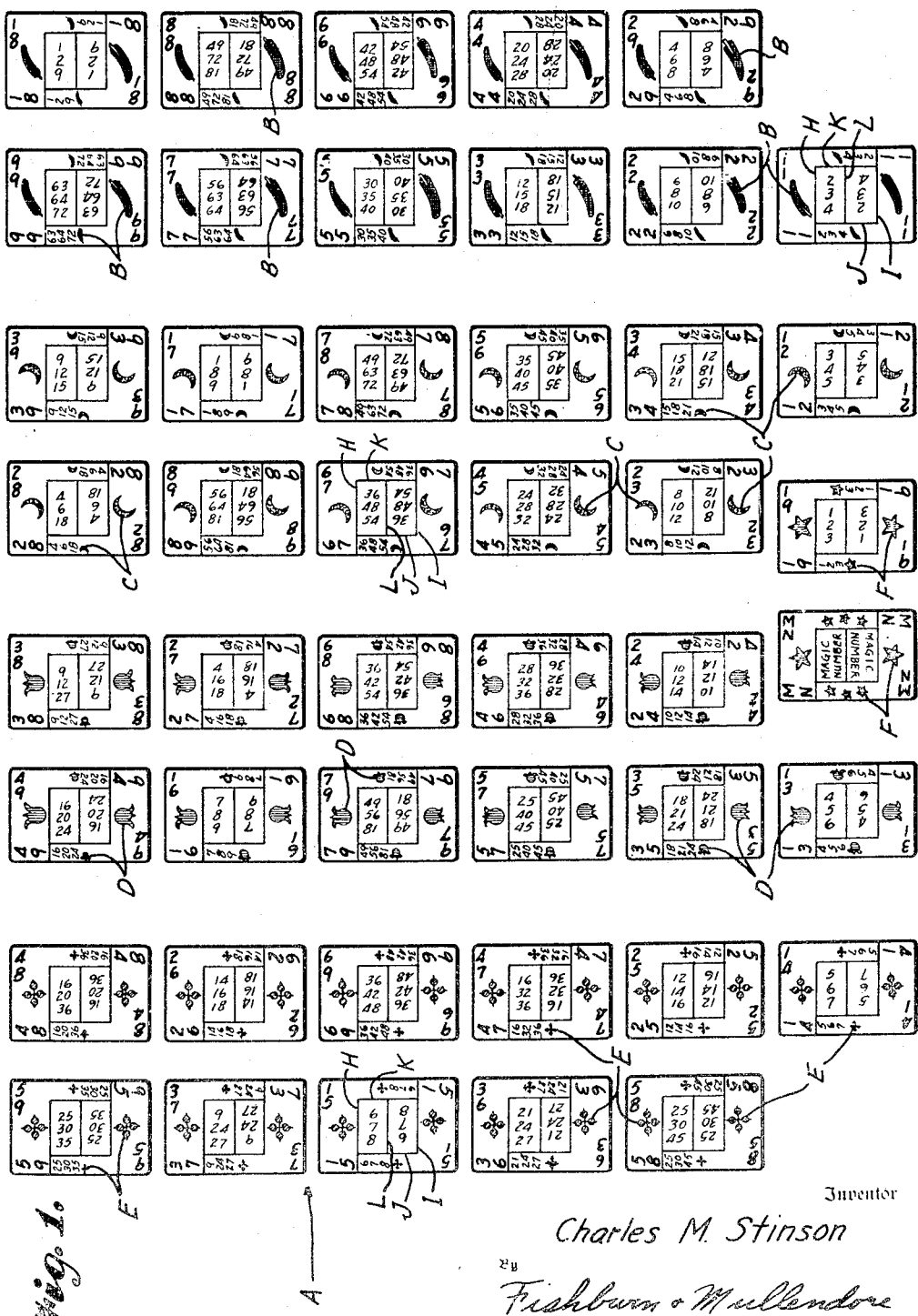
Fig. 1 is a composite view in elevation of the faces of the cards of an entire pack with the indicia thereon.

Referring more in detail to the drawings:

A designates a pack of cards consisting of any preferred number of units, as for instance 46, the back or reverse sides of which are preferably plain or ornamented in a uniform or like manner throughout. The cards may take any desired form as to material and construction. Upon the front face of each card are combinations of numerals and symbols for the purpose of playing certain games, the symbols being used to divide the pack of cards into suits of which there are four suits of eleven cards, and one suit containing two cards. Preferably the suits have different ranking for the scoring, a quill B identifying the suit having the lowest scoring value and preferably being printed in black color for aiding in distinguishing said suit. The next ranking suit is indicated by a moon C preferably printed in orange or yellow. The next ranking suit is distinguished by a tulip D, said suit preferably being distinguished by a red color, the highest scoring rank of the eleven card suit being indicated by a cross E, distinguished by the color green. The two card suit has the highest scoring value and is preferably indicated by a star F and distinguished by violet color. The color of the suits will aid people in sorting the cards into various suits, and the symbols will provide means for the sorting of the suits by color-blind people. The number of points in a symbol's design shows the rank of the suit on which the symbol is found. The lowest ranking suit is the quill suit and this is indicated by the simple point of the quill; next is the moon with two points, the tulip with three points, the cross with four points, and the star with five points (highest). By using these suit ranks in conjunction with the plus numbers to determine the rank of the cards, no two cards would have the same rank; for instance, the five cards with plus values of ten will not have the same rank since they are all in different suits. The symbols designating the five suits are such that can be easily identified and the names of said symbols easily pronounced, said names all having a first letter that is different from the other four so the initial letter can be used in writing and keeping score.

For ease in identifying the suits, each card is preferably provided with four of said symbols, each being centrally located adjacent the ends and sides of said cards as illustrated in Fig. 1. One of the cards of the two card suit indicated by the star symbol is termed a magic number card and is provided with identifying letters M—N in each of the corners of said card, the letters being so arranged that in any position of the cards said letters will appear upright in the upper left-hand corner, and the words "Magic Number" are printed in the center portion of this card, above and below the vertical center thereof, said wording being so arranged that the wording on the upper portion of the card is right side up to the player.

The other forty-five cards of the pack each has a pair of identity numerals arranged in each corner of said card whereby the numerals appear in the upper left-hand corner regardless of the position in which the card is held with one of the numerals below the other. This arrangement allows a handful of cards to be assembled in such a way as to hold it easily and at the same time view the values on all of the cards. It also allows the values to be read from either end or side of the card when it is placed on the table. The identity numbers are preferably arranged whereby the position of the respective numerals at one end of the card is reverse to that of the numerals at the other end, for example the card having the identity numerals 1 and 7 as shown in Fig. 2 has the numeral 1 over the numeral 7 in the upper left-hand corner and the upper right-hand corner. When the card is reversed to the position shown in Fig. 2, the numeral 7 will appear above the numeral 1 in both of the upper corners of said card. This arrangement is for educational purposes and provides practice in using a numeral combination in the two positions both commonly found in mathematical problems.

The combinations of identity numerals for each suit are shown in Fig. 3 on an auxiliary card G, said combinations of identity numerals being arranged on a horizontal line designated by the particular suit symbol. The following is a list of the identity numerals preferably used, arranged in groups according to the lowest number of each combination:

$$\begin{Bmatrix}1\\1\end{Bmatrix}\begin{Bmatrix}1\\2\end{Bmatrix}\begin{Bmatrix}1\\3\end{Bmatrix}\begin{Bmatrix}1\\4\end{Bmatrix}\begin{Bmatrix}1\\5\end{Bmatrix}\begin{Bmatrix}1\\6\end{Bmatrix}\begin{Bmatrix}1\\7\end{Bmatrix}\begin{Bmatrix}1\\8\end{Bmatrix}\begin{Bmatrix}1\\9\end{Bmatrix}\begin{Bmatrix}2\\2\end{Bmatrix}\begin{Bmatrix}2\\3\end{Bmatrix}\begin{Bmatrix}2\\4\end{Bmatrix}\begin{Bmatrix}2\\5\end{Bmatrix}\begin{Bmatrix}2\\6\end{Bmatrix}\begin{Bmatrix}2\\7\end{Bmatrix}\begin{Bmatrix}2\\8\end{Bmatrix}\begin{Bmatrix}2\\9\end{Bmatrix}$$

$$\begin{Bmatrix}3\\3\end{Bmatrix}\begin{Bmatrix}3\\4\end{Bmatrix}\begin{Bmatrix}3\\5\end{Bmatrix}\begin{Bmatrix}3\\6\end{Bmatrix}\begin{Bmatrix}3\\7\end{Bmatrix}\begin{Bmatrix}3\\8\end{Bmatrix}\begin{Bmatrix}3\\9\end{Bmatrix}\begin{Bmatrix}4\\4\end{Bmatrix}\begin{Bmatrix}4\\5\end{Bmatrix}\begin{Bmatrix}4\\6\end{Bmatrix}\begin{Bmatrix}4\\7\end{Bmatrix}\begin{Bmatrix}4\\8\end{Bmatrix}\begin{Bmatrix}4\\9\end{Bmatrix}$$

$$\begin{Bmatrix}5\\5\end{Bmatrix}\begin{Bmatrix}5\\6\end{Bmatrix}\begin{Bmatrix}5\\7\end{Bmatrix}\begin{Bmatrix}5\\8\end{Bmatrix}\begin{Bmatrix}5\\9\end{Bmatrix}\begin{Bmatrix}6\\6\end{Bmatrix}\begin{Bmatrix}6\\7\end{Bmatrix}\begin{Bmatrix}6\\8\end{Bmatrix}\begin{Bmatrix}6\\9\end{Bmatrix}\begin{Bmatrix}7\\7\end{Bmatrix}\begin{Bmatrix}7\\8\end{Bmatrix}\begin{Bmatrix}7\\9\end{Bmatrix}$$

$$\begin{Bmatrix}8\\8\end{Bmatrix}\begin{Bmatrix}8\\9\end{Bmatrix}\begin{Bmatrix}9\\9\end{Bmatrix}$$

In playing various games each of the forty-five cards having identity numerals has five number values not shown on the card. There is a plus number value which is the sum of the pair of identity numerals on the respective cards. Each card has a minus number value which is the difference between the pair of identity numerals. The times number value is the product of the respective pair of identity numerals and a division number value that is found by dividing the large numeral by the small identity numeral. There is also a major minus number of each card, said number being the difference between the card's minus number and ten. The major minus number may be calculated by adding ten to the card's smaller identity numeral and from this sum subtracting the larger identity numeral. None of these five number values is shown on the respective cards; however, each card has groups of three numbers printed on it that are the products of three different pairs of identity numerals found on other cards. The products on all of the cards except those having identity numerals 7—7, 7—8, 7—9, 8—8, 8—9, and 9—9, are three selected multiples of the smaller identity numeral of the pair on said card, all of the multiples from the square of said smaller numeral to the product of said smaller numeral and nine being on a card bearing said smaller numeral. The products on said excepted cards are products of identity numerals but have no particular relationship to the identity numerals of the card on which they appear. These groups of product numerals are preferably arranged in a vertical line under the identity numeral appearing in the upper left-hand corner of said card. For example as illustrated in Fig. 2 on the card having the identity numerals 1—7 a group of product numerals 1, 8 and 9 is arranged under the identity numerals in the upper left-hand corner of the card, a group of said product numerals appearing upside down in the lower portion of the card adjacent the right-hand side thereof, whereby when the card is inverted said product numerals will appear right side up below the identity numerals 7—1 which would then be in the upper left-hand corner. The identity numerals are preferably separated from the group of product numerals on the respective cards by horizontal lines H and I extending from the side of the card adjacent said groups of numerals and arranged between said identity numerals and the product numerals, said lines terminating short of the opposite side of the card and being connected by vertical lines J and K arranged parallel with the respective sides and spaced therefrom sufficiently to provide space for the vertical row of product numerals.

The area enclosed by the horizontal and vertical lines is preferably provided by a horizontal line L substantially at the vertical center of the card and connecting the two vertical lines J and K, providing two enclosed areas in which is located another group of the product numerals arranged in a row whereby they may be read from the side of the card, the group in the upper portion being read from the left-hand side of the card and the group in the lower portion being read from the right-hand side of the card. The arrangement of the pairs of identity numerals and the groups of products is preferably such that will allow multiplication and division games to be played with small groups of the cards, thus eliminating the necessity of using the entire pack of cards. This feature is valuable when playing games with children who learn the multiplication tables by groups of paired numerals. This arrangement allows the multiples of 1 to be used in a game and the higher groups may be progressively added to the game as the child advances in his school work.

The multiples of one (1) which are 1, 2, 3, 4, 5, 6, 7, 8 and 9, are printed on the cards with the following pairs of numerals:

$$\begin{Bmatrix}1\\1\end{Bmatrix}\begin{Bmatrix}1\\2\end{Bmatrix}\begin{Bmatrix}1\\3\end{Bmatrix}\begin{Bmatrix}1\\4\end{Bmatrix}\begin{Bmatrix}1\\5\end{Bmatrix}\begin{Bmatrix}1\\6\end{Bmatrix}\begin{Bmatrix}1\\7\end{Bmatrix}\begin{Bmatrix}1\\8\end{Bmatrix}\begin{Bmatrix}1\\9\end{Bmatrix}$$

The multiples of two (2) which are 4, 6, 8, 10, 12, 14, 16, and 18, are printed on the cards with the following pairs of numerals:

$$\begin{Bmatrix}2\\2\end{Bmatrix}\begin{Bmatrix}2\\3\end{Bmatrix}\begin{Bmatrix}2\\4\end{Bmatrix}\begin{Bmatrix}2\\5\end{Bmatrix}\begin{Bmatrix}2\\6\end{Bmatrix}\begin{Bmatrix}2\\7\end{Bmatrix}\begin{Bmatrix}2\\8\end{Bmatrix}\begin{Bmatrix}2\\9\end{Bmatrix}$$

The multiples of three (3) which are 9, 12, 15, 18, 21, 24 and 27, are printed on the cards with the following pairs of numerals:

$$\begin{Bmatrix}3\\3\end{Bmatrix}\begin{Bmatrix}3\\4\end{Bmatrix}\begin{Bmatrix}3\\5\end{Bmatrix}\begin{Bmatrix}3\\6\end{Bmatrix}\begin{Bmatrix}3\\7\end{Bmatrix}\begin{Bmatrix}3\\8\end{Bmatrix}\begin{Bmatrix}3\\9\end{Bmatrix}$$

The multiples of four (4) which are 16, 20, 24, 28, 32 and 36, are printed on the cards with the following pairs of numerals:

$$\begin{Bmatrix}4\\4\end{Bmatrix}\begin{Bmatrix}4\\5\end{Bmatrix}\begin{Bmatrix}4\\6\end{Bmatrix}\begin{Bmatrix}4\\7\end{Bmatrix}\begin{Bmatrix}4\\8\end{Bmatrix}\begin{Bmatrix}4\\9\end{Bmatrix}$$

The multiples of five (5) which are 25, 30, 35, 40, and 45, are printed on the cards with the following pairs of numerals:

$$\begin{Bmatrix}5\\5\end{Bmatrix}\begin{Bmatrix}5\\6\end{Bmatrix}\begin{Bmatrix}5\\7\end{Bmatrix}\begin{Bmatrix}5\\8\end{Bmatrix}\begin{Bmatrix}5\\9\end{Bmatrix}$$

The multiples of six (6) which are 36, 42, 48 and 54, are printed on the cards with the following pairs of numerals:

$$\begin{Bmatrix}6\\6\end{Bmatrix}\begin{Bmatrix}6\\7\end{Bmatrix}\begin{Bmatrix}6\\8\end{Bmatrix}\begin{Bmatrix}6\\9\end{Bmatrix}$$

The multiples of seven (7) which are 49, 56, and 63, the multiples of eight (8) which are 64, and 72, and the multiple of nine (9), which is 81, are printed on the cards with the following pairs of numerals:

$$\begin{Bmatrix}7\\7\end{Bmatrix}\begin{Bmatrix}7\\8\end{Bmatrix}\begin{Bmatrix}7\\9\end{Bmatrix}\quad\begin{Bmatrix}8\\8\end{Bmatrix}\begin{Bmatrix}8\\9\end{Bmatrix}\quad\begin{Bmatrix}9\\9\end{Bmatrix}$$

For assistance in determining the product of identity numerals, an auxiliary card M is provided in which the respective unit numbers are arranged in a vertical column and a horizontal column with the product of the two numbers given in a square, which is in horizontal alignment with one of the identity numerals and vertical alignment with the other identity numeral being multiplied.

The grouping of the suits according to the minus number value of the identity numerals is illustrated by the card N in Fig. 4 wherein the suit having the quill as a symbol includes the identity numerals the minus numbers of which are 0 and 7. The suit having the symbol of a moon includes the identity numeral cards having a minus number value of 1 and 6. The suit having a tulip symbol includes the identity numeral cards having a minus number value of 2 and 5. The suit having the cross symbol includes the identity numeral cards having the minus number value of 3 and 4. The suit having the star symbol includes the identity card having a minus number value of 8 and the Magic Number card.

Many games and variations thereof may be played with the cards having numerals arranged as described. For the purpose of illustration, let it be assumed that the game is to use the plus number value of the cards giving practice to the players in addition. The players are seated around a table, a dealer selected, the cards fairly shuffled, and dealt one at a time face down until each player has four cards. The remainder of the pack is separated into two groups and stacked crisscross in a pile, which is called the stock pile. Only the plus number value of the card is used in this game and it is necessary for the players to determine plus number of a card and know when the plus number of another card is identical with the first card. The person to the left of the dealer is the first player and he plays one or more cards by laying same face up on the table, and the next player must play a card having the same plus value as the lead cards, or be penalized by having to draw two cards from the stock pile. If said next player is not able to play a card that matches the lead card, he draws the two cards and then is allowed to play a lead card, or several cards if they all match one another, by placing same on the top of the first lead card. This forms the playing stack in the center of the table. The next player only plays to the top card on the playing stack and must play a card having the same plus value or draw two cards. This play continues until one of the players is out of cards, the first one playing all of his cards in his hand being declared the winner. A holder of the Magic Number card may call it any value he so desires to match another card or when leading it may give it a fantastic number, forcing the next player to draw. Since the plus number value is not printed on the card the players must add the identity numbers to determine said value in the playing of the game.

A game may also be played using the minus number value of the card, matching the cards and playing in substantially the same manner as playing with the plus values. Also the major minus value of the cards may be used in playing a similar game.

A game which may be termed a "times" game using the multiplication of the identity numbers may be played in a similar manner to the "plus" game, with the exception that the product of the identity numerals is used for the value of the cards being played and said product must be the same as one of the given products on the card to which it is to be played. For example, the cards having the following identity numerals 1—4, 1—8, 2—2, 2—3 and 2—4 can be played to the card having the identity numerals 2—9 as said card has the given products 4, 6 and 8 thereon.

Games may be played that require the use of division. In a game of this kind the large identity numeral of one card could be required to go into one of the given products of a second card before it could be played to the second card. The plus number or the times number of a card could be substituted for the large identity numeral as a divisor to go into the given product of another card.

Games may be played using the various colors or suits wherein one player will lead a card and the next player may capture same by playing a card of the same suit. In such a game each player would draw on each play and the person taking the most cards would be the winner. Such a game would provide amusement and education in the matching of colors. More complicated games and various modifications of such games may be used. For example, the cards may be played according to the symbol or color designating the suit wherein the players must bid for the right to name trump. In such a game one card from each player may be called a trick and the person or partners taking the most tricks will be the winner. The suits being given different values, the value in the scoring of the trick would be determined by the suit that was named trumps. In playing such a game the ranking of the cards in the various suits would be determined by the trump named and value of the identity numbers, the highest trump being the card having the highest plus number value of the suit. This is only an indication of the number of games that may be played and it is believed obvious that many amusing and interesting, as well as instructive games, may be played giving actual practice in the simple fundamentals of mathematics and requiring the players to develop their perception and ability to quickly perform addition, subtraction, division, and multiplication mentally, alertness and speed of thought being an important factor in determining the ability of the players.

What I claim and desire to secure by Letters Patent is:

Playing cards comprising a plurality of rectangular cards having uniform backs, symbols on the faces adjacent each of the edges of the cards, the symbols on some cards differing from the symbols on others to divide the cards into groups representing different suits, pairs of identity numerals arranged in columns at each corner on the faces of each card and the columns positioned relative to the edges of the cards whereby there is a column of identity numerals readable from each of the sides and ends of said cards, the order of identity numerals in the columns at one end of each card being in reverse to the order in the columns at the other end, the pair of identity numerals of each card being different than the combination of identity numerals on any other card, the sum of the identity numerals of any pair on a card being from two to eighteen, the pairs of identity numerals being arranged in suits whereby the difference of the numerals in each pair of identity numerals of a suit is one of two numbers, other numerals in groups of three on each of said cards, said other numerals being arranged in columns, one of said columns being adjacent each of the side edges of the card in line with and readable from the same end as the column of identity numerals in the adjacent corner, lines on the face of the card between the column of identity numerals and the column of other numerals, said lines being parallel with the end edges of the card, a line on each card parallel with the end edges and equally spaced from the first named lines, and lines parallel with the side edges of the card cooperating with the lines parallel with the end edges to define two areas in the central portion of the card, columns of said other numerals in each of said areas with the column in one being readable from one side of the card and the column in the other readable from the other side, said other numerals on each card being a product of a pair of identity numerals of a separate card, substantially all of said product being three selected multiples of the smaller identity numeral of the pair on said card, all of the multiples from the square of said smaller numeral to the product of said smaller numeral and nine being on various cards bearing said smaller numeral.

CHARLES M. STINSON.

REFERENCES CITED

The following references are of record in the file of this patent:

UNITED STATES PATENTS

| Number | Name | Date |
| --- | --- | --- |
| D. 44,430 | Wilson | July 29, 1913 |
| 1,293,183 | Peckham | Feb. 4, 1919 |
| 1,322,204 | Schuchard | Nov. 18, 1919 |
| 1,751,523 | Morgan | Mar. 25, 1930 |

FOREIGN PATENTS

| Number | Country | Date |
| --- | --- | --- |
| 519,336 | Great Britain | Mar. 21, 1940 |